3,445,485
1-AMINO-2 METHYLOLCYCLO-HEXYLMETHOXY-
4-HYDROXY-ANTHRAQUINONES
James M. Straley, Kingsport, Tenn., assignor to Eastman Kodak Company, Rochester, N.Y., a corporation of New Jersey
No Drawing. Filed Sept. 21, 1964, Ser. No. 398,092
Int. Cl. C09b 1/22, 1/50
U.S. Cl. 260—380
4 Claims This invention relates to anthraquinone compounds particularly useful as dyes for textile fibers, yarns and fabrics.

The anthraquinone compounds of the invention have the general formula

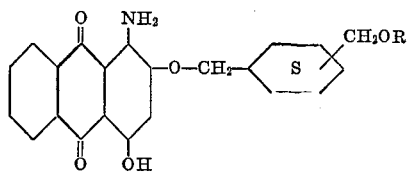

wherein R represents either hydrogen or lower alkyl of 1 to 4 carbon atoms.

The anthraquinone compounds can be used for dyeing textile materials including synthetic polymer fibers, yarns and fabrics giving fast red shades when applied by conventional dyeing methods to cellulose ester, polyamide and polyester fibers. When the anthraquinone compounds are used for dyeing such hydrophobic materials, they should be free of water-solubilizing groups such as sulfo and carboxyl groups. In general, the dyes have good fastness, for example, to light, washing, gas (atmospheric fumes) and sublimation. The compounds can be expected to possess properties as dyes distinct from similar anthraquinone compounds containing substituents such as 2-alkoxy, 2-cyclohexyloxy or phenylalkoxy rather than the 2-cyclohexylalkoxy group of the compounds of the invention.

The anthraquinone compounds can be obtained by several methods including (a) the action of the cyclohexanemethanol on 1-amino-4-hydroxy-2-phenoxyanthraquinone, and (b) the action of the cyclohexanemethanol on 1-amino-4-hydroxyanthraquinone-2-sulfonic acid or its salts, illustrated by the examples below.

The following examples will serve to illustrate our invention.

Example 1

5.4 g. of 1-amino-4-hydroxy-2-phenoxyanthraquinone, 15.0 g. of 1,2-cyclohexanedimethanol, 2.1 g. of finely-divided potassium hydroxide, 18 ml. pyridine, and 60 ml. dimethylformamide were heated to 125° C. and held at that temperature for a period of 8 hr. The material was drowned in water, with sufficient acetic acid added subsequently to neutralize the alkali. The precipitate which was filtered out was recrystallized from aqueous isopropanol. The small amount of anthraquinone intermediate remaining in the product was dissolved out by precipitating an acetone solution of the dye in ten volumes of hexane. The product is 1-amino-4-hydroxy-2-[2-(hydroxymethyl)cyclohexanemethoxy]anthraquinone, and dyes polyesters in bright, light-fast, bluish-red shades, with good resistance to sublimation.

Example 2

After 20.0 g. of 1,3-cyclohexanedimethanol had been heated to 140–145° C., 0.8 g. of potassium hydroxide was added. The material was stirred under a slight vacuum to remove any moisture. 2.0 g. of 1-amino-4-hydroxy-2-phenoxyanthraquinone was added, and the temperature of 140–145° C. was maintained for 18 hr. The product was obtained by diluting the material with 75 ml. hot water, added slowly, and by filtering the material at about 98° C., followed by a wash of hot water. The product dyes polyesters in bright, light-fast, red shades, with good resistance to sublimation.

Example 3

In the process of Example 2 the 1,3-cyclohexanedimethanol was replaced by trans-1,4-cyclohexanedimethanol. From 36.0 g. of 1-amino-4-hydroxy-2-phenoxyanthraquinone was obtained 37.0 g. of dye. When recrystallized from 2-methoxyethanol, it melted at 225–225.5° C. It dyes polyesters a bright, light-fast, red shade with good resistance to sublimation. The dye has the formula

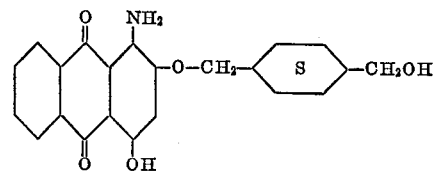

Example 4

The process of Example 2 was carried out except that 1,3-cyclohexanedimethanol may be replaced by cis-1,4-cyclohexanedimethanol.

Example 5

1.9 g. of 1-amino-4-hydroxy-2-phenoxyanthraquinone, 0.7 g. of potassium hydroxide, and 0.2 ml. of pyridine were added to 10.0 g. of 4-methoxymethylcyclohexanemethanol and 20 ml. of dimethylformamide at 125° C. for 11.5 hr. The mixture was drowned in water to obtain the dye, mixed with the 4-methoxymethylcyclohexanemethanol. The latter was removed by first washing the precipitate in aqueous methanol, then slurrying the precipitate in hot methanol, adding a small amount of water, and cooling to obtain the precipitate.

Example 6

1.00 g. of 1-amino-4-hydroxyanthraquinone-2-sulfonic acid, sodium salt, 3.00 g. of cis-trans-1,4-cyclohexanedimethanol, 1.00 g. of ground potassium hydroxide, and 15 ml. dimethylsulfoxide were stirred on the steam bath for 2 hr. On drowning in water and neutralizing the alkali, the product was obtained, which, after recrystallization, dyes Dacron a red shade fast to light and sublimation.

The anthraquinone compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 3,043,827. The following example illustrates methods by which the anthraquinone compounds of the invention can be used to dye textile materials.

0.1 gram of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqpeous 0.2% soap, 0.2% soda-ash solution. After scouring, the fabric is rinsed with water and dried. Accordingly, since the anthraquinone compounds of the invention are water-insoluble, they can be applied from aqueous dispersions in the manner of the so-called "dispersed dyes." However, coloration can also be effected, for example, by incorporating the anthraquinone compounds into the spinning dope and spinning the fiber as usual. The anthraquinone compounds of our invention have varying utility as dyes. The degree of utility varies, for example, depending upon the material being dyed and the formula of the anthraquinone compound. Thus, for example, all the dyes will not have the same degree of utility for the same material.

Cellulose esters which can be dyed with the anthraquinone compounds include cellulose aliphatic carboxylic acid esters having 2 to 4 carbon atoms in the acyl groups thereof, by which we mean to include, for example, both partially hydrolyzed and unhydrolyzed cellulose acetate, cellulose propionate and cellulose acetate-butyrate.

Polymeric linear polyester materials of the terephthalate type are illustrative of the linear aromatic polyester textile materials that can be dyed with the new anthraquinone compounds of our invention. The terephthalate fibers sold under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Nylon, in fiber, yarn and fabric form, is representative of polyamides which can be dyed with the anthraquinone compounds.

The invention has been described in considerable detail with particular reference to certain preferred embodiments thereof, but it will be understood that variations and modifications can be effected within the spirit and scope of the invention as described hereinabove, and as defined in the appended claims.

What I claim is:
1. Anthraquinone compounds having the formula

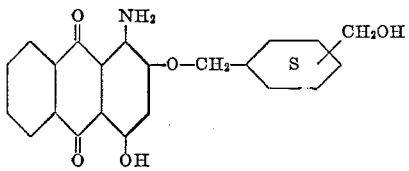

2. The compound

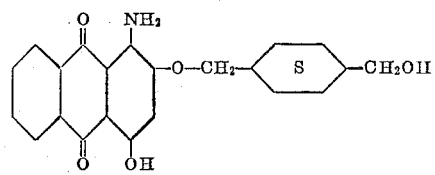

3. The compound

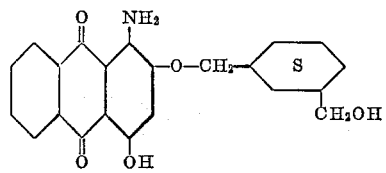

4. The compound

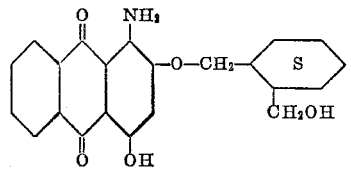

References Cited

UNITED STATES PATENTS

| | | | |
|---|---|---|---|
| 2,773,071 | 12/1956 | Pizzarello et al. | 260—380 |
| 2,972,622 | 2/1961 | Grossmann | 260—380 |
| 2,992,240 | 7/1961 | Lodge | 260—380 |

LORRAINE A. WEINBERGER, *Primary Examiner.*

HAROLD C. WEGNER, *Assistant Examiner.*

U.S. Cl. X.R.

8—39, 40